US009566586B1

(12) United States Patent
Manis

(10) Patent No.: US 9,566,586 B1
(45) Date of Patent: Feb. 14, 2017

(54) POLYMER RECYCLING DEVICE AND METHOD

(71) Applicant: Unique Systems, LLC, Sugar Valley, GA (US)

(72) Inventor: Anthony B. Manis, Sugar Valley, GA (US)

(73) Assignee: Unique Systems, LLC, Sugar Valley, GA (US)

( * ) Notice: Subject to any disclaimer, the term of this patent is extended or adjusted under 35 U.S.C. 154(b) by 483 days.

(21) Appl. No.: 13/734,315

(22) Filed: Jan. 4, 2013

Related U.S. Application Data

(60) Provisional application No. 61/585,900, filed on Jan. 12, 2012.

(51) Int. Cl.
*B02C 23/08* (2006.01)

(52) U.S. Cl.
CPC .................... *B02C 23/08* (2013.01)

(58) Field of Classification Search
CPC ............ B02C 18/0084; B02C 18/0092; B02C 18/086; B02C 18/0093; B02C 23/18; B02C 2201/06; B02C 23/08; B07B 15/00; B07B 13/003; B07B 7/01
USPC ........ 241/23, 65, 79.1, 20, 62, 282.1, 282.2, 241/248, 257.1, 258, 152.2, 260.1, 79, 241/46.01–46.17
See application file for complete search history.

(56) References Cited

U.S. PATENT DOCUMENTS

| | | | | |
|---|---|---|---|---|
| 1,766,325 A * | 6/1930 | Boze | ...................... | B02C 4/02 241/155 |
| 2,609,150 A * | 9/1952 | Bludeau | ......................... | 241/15 |
| 4,427,157 A * | 1/1984 | Klein | ............................. | 241/15 |
| 4,538,767 A * | 9/1985 | Pimley | .................... | B03B 9/061 209/270 |
| 5,695,130 A * | 12/1997 | Csendes | ........................ | 241/19 |
| 6,216,967 B1* | 4/2001 | Hoberg | .................. | B29B 17/02 241/21 |
| 7,677,397 B2 * | 3/2010 | Bjornson et al. | ............ | 209/672 |
| 2003/0010360 A1* | 1/2003 | Klenk | .................... | B29B 17/02 134/25.1 |

* cited by examiner

*Primary Examiner* — Mark Rosenbaum
(74) *Attorney, Agent, or Firm* — Chambliss, Bahner & Stophel, P.C.

(57) ABSTRACT

A recycling separator system utilizes at least one, and preferably a series of cutters, which may be contained in sections whereby input is combined with fluid and directed through the cutters, such as in series, and then settled material may be removed through one of traps and sinks as at least a component of a first recycled material while floating material may be removed through float outputs as at least a component of a second recycled material.

19 Claims, 5 Drawing Sheets

POLYMER RECYCLING DEVICE AND METHOD

CLAIM OF PRIORITY

This application claims the benefit of U.S. Provisional Patent Application No. 61/585,900 filed Jan. 12, 2012 which is incorporated by reference herein in its entirety.

FIELD OF THE INVENTION

The present invention relates to a method of recycling principally polymers often referred to as plastics such as, but not limited to, nylon, polyester, polypropylene and others.

BACKGROUND OF THE INVENTION

For years, various efforts have gone into recycling polymers. For instance, carpet is a product often made of nylon with a latex backing. Separating the nylon from the latex after tufting and backing is not a particularly easy process.

Used carpet is often a waste product. Prior endeavors provided a process of shaving the nylon from the backing to reprocess the nylon. Unfortunately, this process leaves a nylon/latex carcass which still goes to the landfill usually after shaving nylon to be reprocessed. Furthermore, this reprocessing step of a nylon usually leads to a reprocessed nylon having a tensile strength of roughly 5,000 to 6,000 psi which is significantly inferior to the 12,000 psi that virgin nylon would otherwise provide due to impurities recycled with the nylon waste.

Other efforts have been made to reprocess PET bottles, often utilized for personal sized water bottles and other plastic bottles. The current methodology cuts bottles into strips or "flakes." Unfortunately, the strips can stick together since they are generally planar sandwiching impurities therebetween. If two of these planar pieces stick together, any impurity therebetween will often need to be eliminated by further processing or will add to the impurity value of the attempt at reclamation of the polymer. There is not believed to be a satisfactory method of addressing impurities currently available in the market.

It is believed that other polymer recycling techniques have other downfalls.

Accordingly, there is a perceived need for an improved likely recycling method and apparatus in an attempt to provide acceptable recycled polymers for reuse to various industries. Some uses may include compound polymers with the recycled material. Other uses may use the recycled materials in other uses, possibly to provide recycled plastics which may have benefits over other materials and some improved properties which can be marketed over new products.

SUMMARY OF THE INVENTION

It is the present object of many embodiments of the present invention to provide an improved method and apparatus for processing polymer or plastic based waste in an effort to recycle polymers for use in future products.

It is an object of many embodiments of the present invention to provide an improved method and apparatus for processing polymers or plastics to achieve a particularly high degree of purity such as within 10% of the tensile strength of the virgin product.

It is another object of many embodiments of the present invention to recycle carpet into its polymer and latex products leaving less than 1% ash and preferably no detectable ash in the recycled polymer product.

It is another object of many embodiments of the present invention to recycle paper based material, films and/or plastic bottle waste.

Accordingly, in accordance with the presently preferred embodiment of the present invention, a waste source such as, but not limited to, bottle flake, bottles, carpet or other polymer or plastic containing waste is fed into an input with a fluid supply such as by auguring or otherwise. The input is then directed towards at least one if not a plurality of blades in a cutting zone which operate in a liquid medium often whereby fluid such as water with a cleaner in solution is preferably added to the waste source and the slurry of water and waste is then directed past the blades where the blades chop, cut, or pull the material into smaller segments. In between successive blades are preferably flow directors or diverters which can assist in directing the flow of the material around and about the subsequent blades. In some embodiments, an impeller may be used in the process to assist the flow of material through the process. With other embodiments the cutters or blades themselves may be configured in a way so as to facilitate the flow of fluid in the desired flow path.

After leaving the hydro-chopping unit, the slurry is potentially directed by a sediment screen which can be utilized to remove contaminants. Then, preferably, the slurry is directed possibly upwardly and/or past a heater and then possibly on down and/or past a cooling unit which preferably cools the slurry to about 25° Fahrenheit or below (or other suitable temperature) to form small ice crystals while not forming a solid mass. This slush has been found particularly helpful to act as small abrasive units blanketing film on at least some chopped material to further assist in removing suspendable top coatings particularly when the slurry is then sent back to the chopper or to another chopper that is in a series of processing steps and/or sections. Not all embodiments utilize a cooler. Finally, the treated product is potentially sent to an outlet which can direct the material to a dryer belt or on to a float and sink process to separate nylon from polypropylene or polypropylene from polyester as it would be known that nylon and polyester would sink in water whereas polypropylene would float. These and/or other separation techniques can be used with various embodiments.

These polymers and/or other materials may be separated by these or other mechanisms. In order to process polypropylene, it could be retrieved from the belt drive system at the bottom of a tank and then dried in or with a dryer or other device for further processing. Furthermore, once material has been separated, whether it be made of either nylon or polyester or other polymer, could be dried and sent on to further processing such as pelletizing or other process or otherwise utilized after having characteristics often similar to almost virgin material for use as recycled product.

BRIEF DESCRIPTION OF THE DRAWINGS

The particular features and advantages of the invention as well as other objects will become apparent from the following description taken in connection with the accompanying drawings in which.

DETAIL DESCRIPTION OF THE PREFERRED EMBODIMENTS

Figure 1:
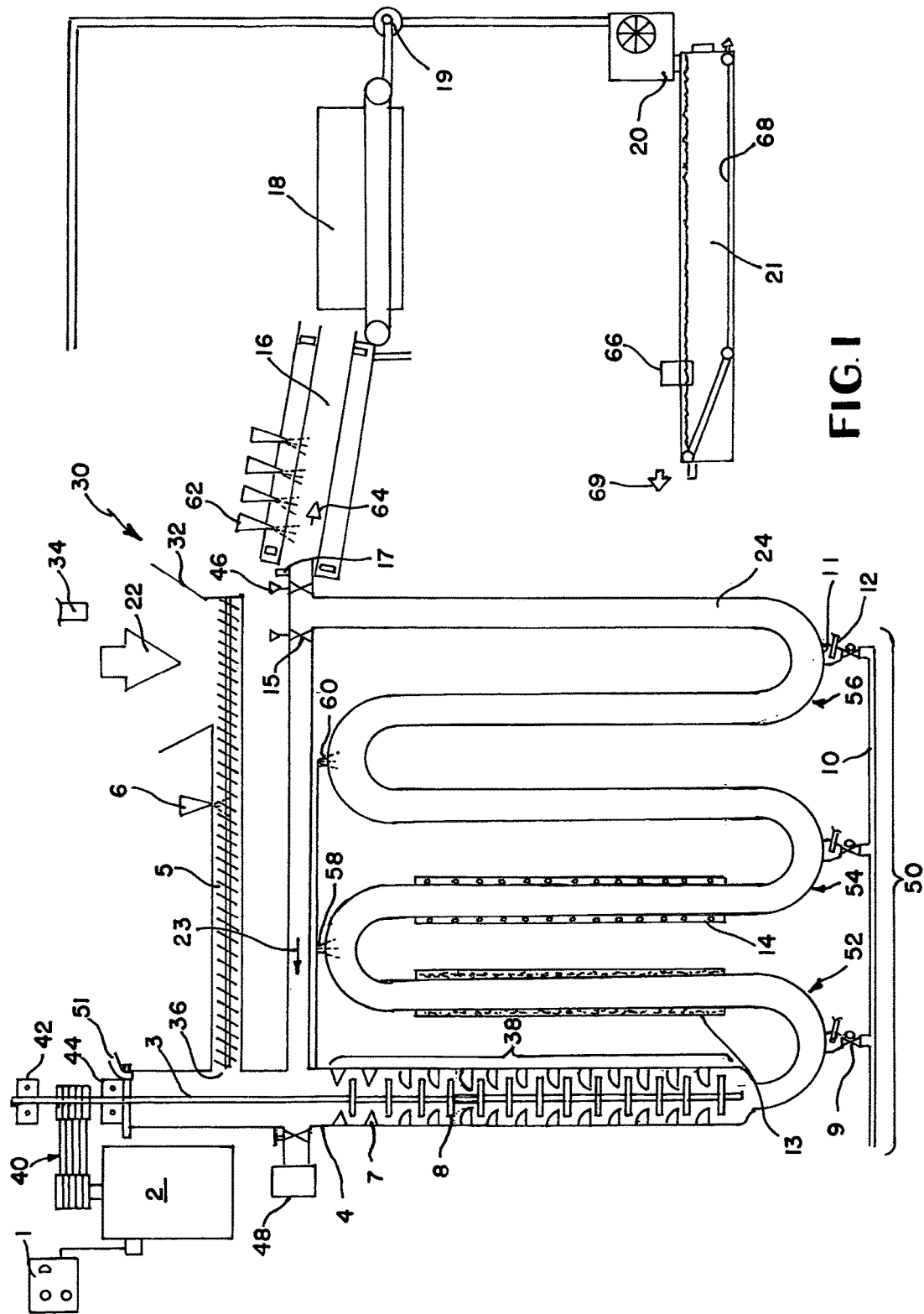
FIG. 1 is a diagrammic representation of the first preferred embodiment showing a process of the present invention of an apparatus for the separating and/or recycling of polymer waste.

A diagrammic representation of a system 30 in accordance with the presently preferred embodiment of the present invention. Input 22 is received into a hopper 32 or otherwise directed input 22 into the system 30. Input 22 may be directed directly onto an auger 5 or otherwise. Input 22 may consist of carpet waste such as nylon with a latex backing, carpet carcasses such as principally the latex backing material with nylon fibers therein, plastic bottles, film based products such as bags, etc, paper based products, plastic waste flakes such as from bottles or other plastic or polymer based waste, and/or other waste(s) can be provided as input.

Input may be provided directly into hopper 32 or as part of a source with a fluid from fluid source 34. Fluid source 34 may include water or other liquid or even other fluid sources or solutions may be utilized. It is understood that water has been found to be a particularly cheap and effective fluid source and works particularly well with certain chemicals, if utilized, as will be described below.

The input 22 is then directed, such as with the auger 5, to have cleaning solution applied at applicator 6 which can apply to cleaning solution to the slurry or to dry waste input 22 depending upon the particular embodiment. The applicator 6 preferably provides a cleaning solution such as CLR™, clothes cleaning disinfectant such as may be provided under the brand Tide with Bleach and/or other appropriate cleaning product or chemical(s) in the applicator 6. The material then can continue into the feed screw to striker zone 4. Concentrated cleaner at this step without significant, if any, fluid addition may be helpful for some embodiments.

Striker zone 4 may have a feed inlet 36 which receives input 22 possibly as directed from hopper 32, auger 5 and/or fluid source 34, or other means. The material provided through the feed inlet 36 then proceeds into the striker zone 4 to be directed past at least one, if not a series of cutters 8 which can be rotating blades or other appropriate cutting mechanisms. In addition to the cutters 8, particularly if there are more than one cutter utilized, there may also be utilized deflectors 7 which can be flow deflectors to redirect the flow back towards the next cutter 8 for additional processing.

In current market, bottle flake is readily available in ground, chopped, sheared and hammered mill form as input 22. It is often bagged, boxed or bailed in the size of two inches or less. This material typically has a high degree of contaminants making it unusable as an almost virgin or virgin form due to the contaminants which can occur between and adjacent the flakes which are not typically removed by the process. This is a particular excellent source for input 22. Carpet, paper and/or film products also make excellent input 22.

Material of this nature when exposed to the striker zone 4 which preferably include one if not a series of blades or cutters 8 preferably submerged in a liquid bath. Liquid may be obtained from fluid source 34 or fluid inlet 51 or other location. During the cutting process, the input 22 is cleaned and simultaneously the shape and size is preferably altered to facilitate segmentation, drying and pelletizing in later stage.

Precleaning of the recycled materials helps reduce gassing during pelletizing which can require gassing off of otherwise considered hazardous waste and therefore subjected to strict protocols. Precleaning can also save on screen changing, thus the improving the quality of the material provided as near virgin material downstream.

Those of ordinary skill in the art will understand that having clean material to pelletize and work with for further processing as recycled material has great advantages over those containing significant quantities of impurities.

While bottle flake can certainly be one source of input 22, carpet waste or other material possibly paper fiber based or plastic based materials can also be utilized. When fiber material is subjected to the cutter(s) 8, the cutters preferably blades rotating at high speeds that are in a liquid or aqueous form are pulled and/or cut by the blades which may assist in creating the flow, washing, scrubbing and cutting which may in some embodiments provide heat loss spinning at high speeds. This process has been found effective at releasing adhesives, oils and other contaminants and comingled with the input 22.

For many embodiments, the cutters 8 may be placed relatively close together such as within about an inch or they may be farther spaced apart depending on the construction of the deflector 7 and the cutters 8. In many commercial embodiments the applicant envisions, the diameter of the striker zone 4 when utilized in the embodiment constructed may be on the order of 24 to 36 inches or even less or greater depending on their needs. In such embodiments, it may be possible that the cutting zone 38 may be contained in an elevation of about 4 to 5 feet or even less. Of course, other embodiments may made to various configurations depending on the particular application.

Figure 2:
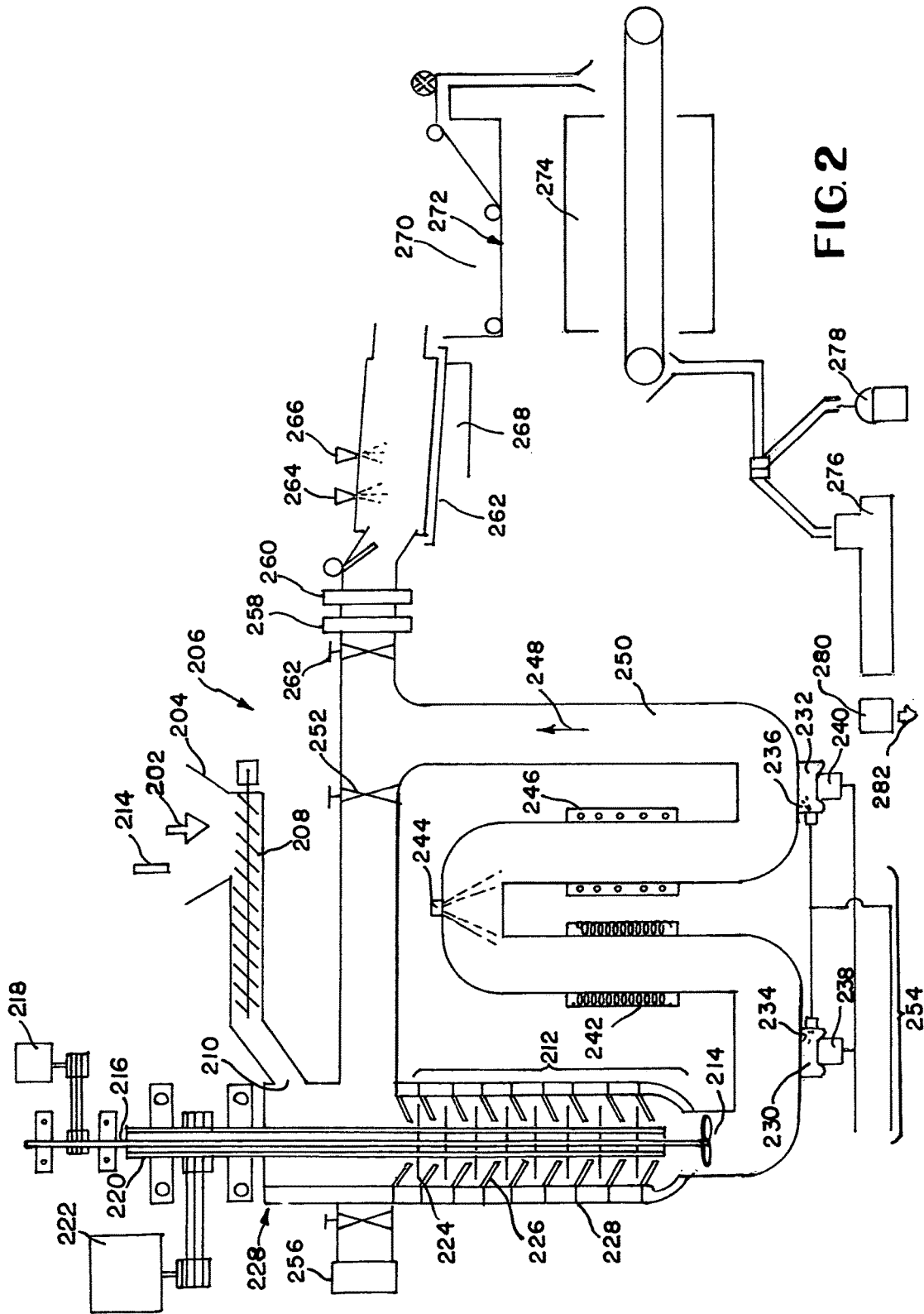
FIG. 2 is a diagrammic representation of an alternative preferred embodiment of the invention shown in FIG. 1.
Figure 3:
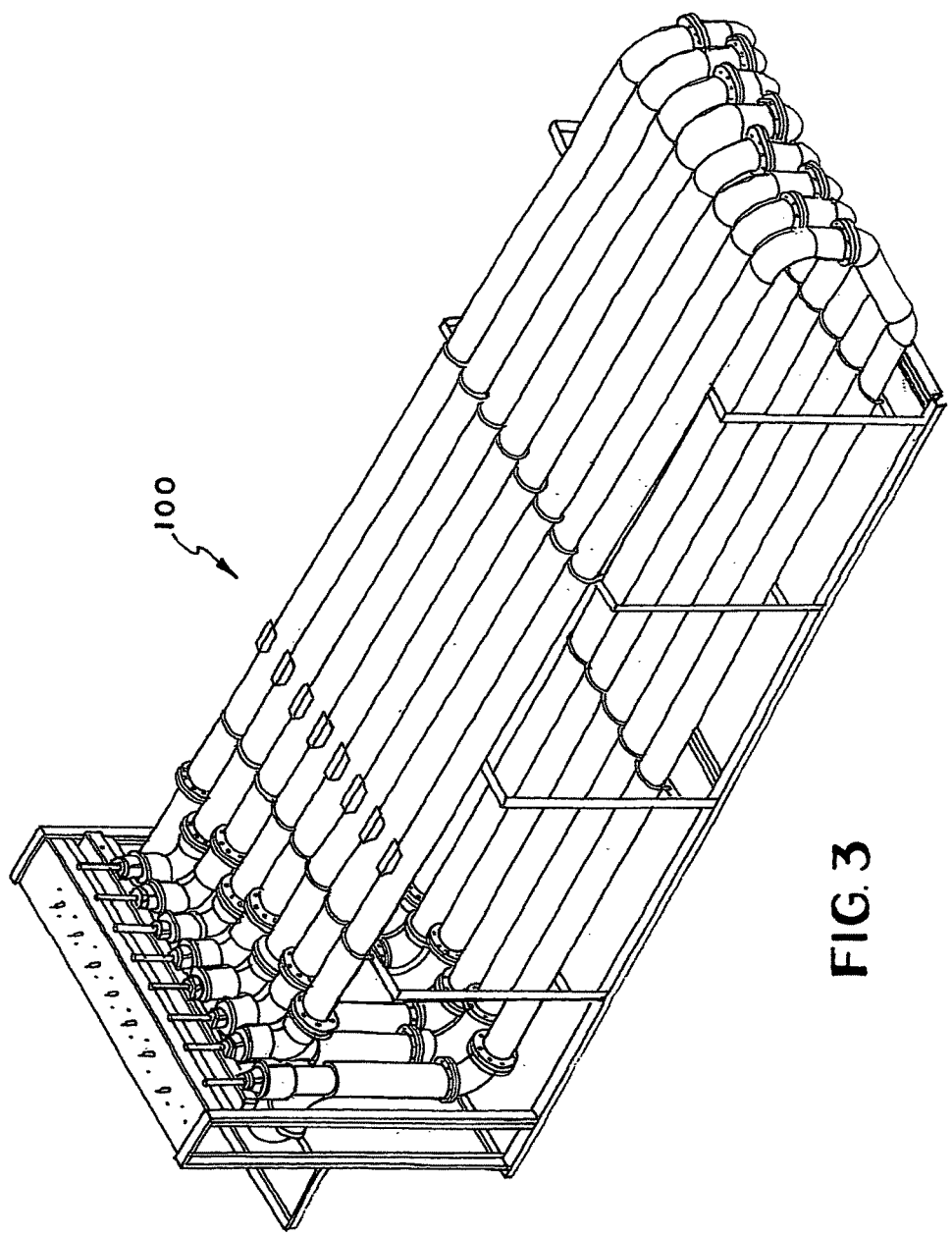
FIG. 3 is a side perspective view of a second alternative preferred embodiment of the invention shown in FIGS. 1 and 2.
Figure 4:
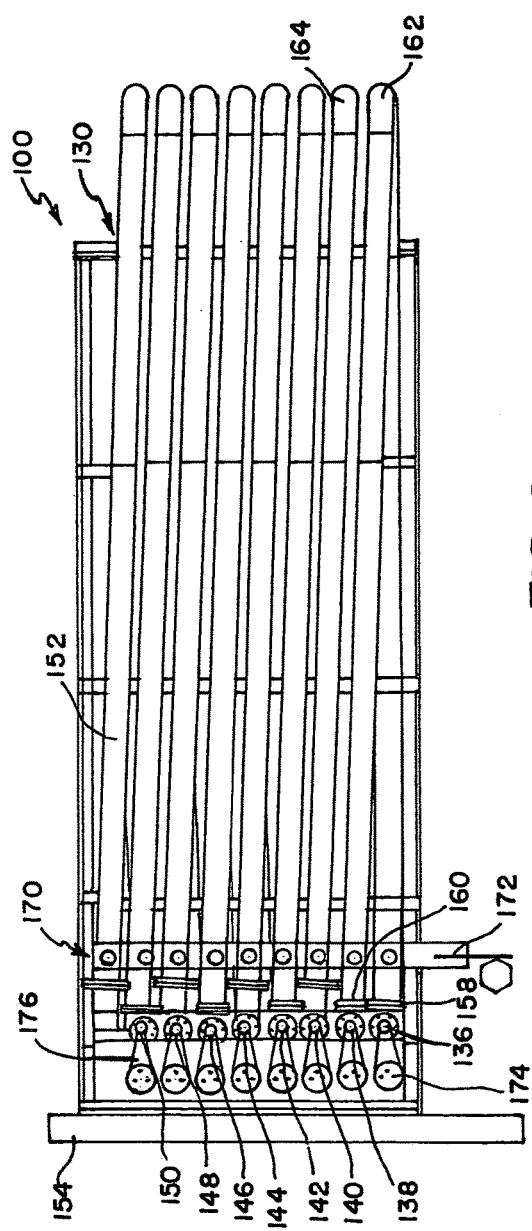
FIG. 4 is a top plan view of an embodiment similar to that shown in FIG. 3.
Figure 5:
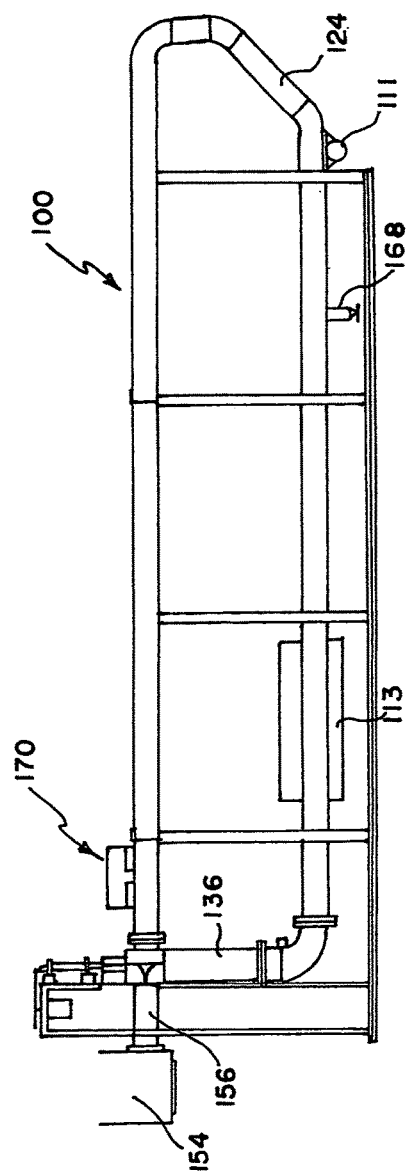
FIG. 5 is a side plan view of the embodiment shown in FIG. 4.
Figure 7:
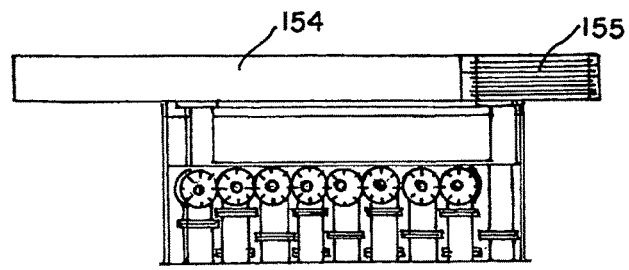
FIG. 7 is a bottom view of the embodiment shown in FIGS. 4-6.
Figure 6:
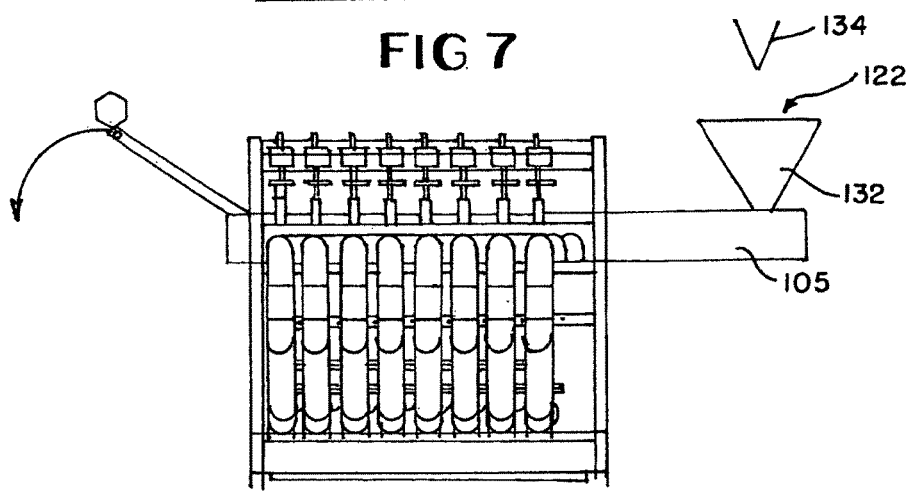
FIG. 6 is a front end view of the embodiment shown in FIGS. 4 and 5.

When processing carpet or other fiber material, input 22 comes into contact with high speed rotating blades provided as cutter(s) 8, in the cutting zone 38. The material is immersed in the fluid such as water. Preferably the cutter(s) 8 is set at a slight angle and the blades are bolted to a round disk and are otherwise provided at an angular nature but alternatively may be assisted by an impeller such as shown in FIG. 2 and will be described in further detail below. A flow is preferably established thereby facilitating flow, washing, scrubbing and the cutting effect in the cutting zone 38 which can also, at least generate heat from spinning at high speeds thereby facilitating removal of adhesives, oils and possibly other contaminants.

The speed of the process such as shown in FIG. 1 of the system 30 can vary. The speed of the blade of the cutter(s) 8 can be varied such as through the use of a variable speed motor 2 which may be controlled by a processor 1 which could be a simplified process such as through the use of a PLC (programmed logic controller) illustrated which allows the operator to program the specific input 22 to the processor 1 which can thereby provide a preprogram speed or speeds to the motor 2 to control the speed of the cutter(s) 8 during operation.

A blade drive shaft 3 may be useful to transmit the rotation of the motor 2 to the cutter(s) 8. Other embodiments may have more or less direct link or a torque transmission system 40 such as belts or gearing as illustrated or other system.

Shaft 3 may be retained in position by bearings such as 42,44 such as pillow block bearings or other appropriate bearings at at least one end. Furthermore, the piping can be round, rectangular, triangular or other shapes that can accommodate the flow of various materials. Depending on the construction of the cutting zone, the deflector 7 may be utilized to assist in providing bearings and/or other supports may be utilized with various embodiments. Still other supports for the shaft 3 may be provided, as would be understood by those of ordinary skill in the art, depending on the construction of the striker zone 4.

Although the striker zone 4 is illustrated as a downward flow device which takes advantage of the use of gravity, others may be laterally oriented, or angularly oriented. Some may even be upwardly oriented as opposed to downwardly oriented as illustrated. Furthermore, various angles and/or configurations could be provided in various constructions.

The speed of the process utilized by the system 30 can be achieved by the use of blades with cutters 8 and the striker zone 4 is illustrated as a tube-like structure having deflector 7. As the material passes through the rotating blades or deflectors, the material moves back and forth through the center and the process can be repeated again and again depending on the number of cutters 8 utilized. Bypass valves 15 can be useful to assist in recirculating tubing material back through the striker zone 4 for multiple passes. Alternatively, process valves 46 may be open to continue the process on downstream as will be explained in further detail below.

Highly contaminated material may proceed through one or more cutters 4 in various stages. In fact, as illustrated by box 48 which is intended to represent a second system such as a system 50 or at least a portion thereof, one will quickly see that multiple systems 30,50 or partial systems can be provided in series as well as in parallel but when provided in series, they can be utilized to continue treatment of untreated materials. This way, highly contaminated materials may be continued through the process until cleaned to a desired degree.

In addition to the action in the cutting zone 38, the chemical supplied with applicator 6 or other applicators in the process can be utilized to enhance the cleaning effect of the system 30. The chemicals can be provided during the process of providing input 22 to the auger 5. The chemical can be worked into the material to allow more time for the chemical to work in a non-diluted form prior to entering a hydro unit such as if additional fluid is introduced or first introduced at tube outlet 52. Fluid inlet 51 could be utilized in addition or instead of fluid source 34.

The rotating cutters 8, rotating at a high rate of speed, such as above 1000 rpm, above 5,000 rpm or even 10,000 rpm or more in an aqueous or liquid environment can create high levels of heat when combined with the input 22. Furthermore, a secondary heating unit 13 may also be utilized for some embodiments as will be discussed below. Secondary heating may be helpful to heat the liquid or slurry based input 22 internal to the system 30 such as when slow speeds such as can be represented by flow 23 in the bypass mode are provided. There are many other uses for providing secondary heat with heaters 13 for at least some embodiments.

In the preferred embodiment, there are locations at lower elevations which provide a sediment screen or trap 11. In the preferred embodiment, the sediment screen can be at the lowest point of the various loops 52,54,56, if utilized. Other lower elevation points or other systems may trap sediment at other points can be utilized for other embodiments. The traps or sediment screens can be bled off or flushed from time to time for contaminant removal such as when electronic solenoid valve 9 or other mechanisms possibly including water jet 12 or other appropriate system. These systems may be utilized to assist in preventing clogging of the trap 11 which can periodically empty the unit. As fluid is removed from discharge 10, additional fluid may be provided through inputs 58,60 or other inlet supply such as fluid inlet 51 or other location.

A cooling unit 14 may also be provided in the system by either the cooling unit 14 preferably can be utilized to chill the fluid to an appropriate temperature such as below 25° Fahrenheit or other appropriate temperature to preferably form small ice crystals without forming a solid mass in the piping 24.

Slush is useful in the treatment of thin film as input 22. Speed control and chill water levels may be dropped to facilitate the cooling of the fluid in the piping 24 possibly after passing through the cutting zone 38. Continuous flow can help in preventing the formation of a solid mass while still allowing small crystals to form. These small crystals can act like abrasive units which otherwise would be adhered to the film surface and thereby help to remove and suspend topical coatings particularly when the bypass valve 15 is open and/or subsequent system 30 is provided such as in series as described above. The second cutting zone 38 is illustrated being provided in series such as the first one being provided within the box 48 as has been described above.

During the removal of sediment such as from traps 11 with flow 23 can be slowed such as by slowing the speed of the motor 222 or otherwise. Speeding up can also occur for at least some embodiments. Furthermore, the system may be stopped periodically to facilitate settling and/or slowed. The motor 2 could be AC or DC or other appropriate driven system.

Sediment can be removed particularly from traps 11 or other systems particularly when processing carpet and/or carcasses of carpet which normally contain latex which can then be reused as recycled latex which is also an important byproduct. Some of the contaminants may need to be gassed off if they are hazardous substances. Many of the byproducts retained in the traps 11 can be recycled and/or reused in other industrial operations.

The valves 9 may be damper controlled to facilitate regulating flow for at least some embodiments. This process could be coordinated with filling such as through inputs 58,60 fluid outlet 50 or other sources for at least some embodiments.

By subjecting film including chopped up bottles through embodiments of this treatment apparatus and method, the blades of the cutters 8 are preferably selected so the treated input are crimped and buckled after treatment which allows for the ease of cleaning and drying and preventing the film segments to layer in parallel sheets so that impurities can be trapped in between them as has been known in prior art technology.

Fiber treated input 22 includes fibers of latex and/or secondary backing can be relatively easily treated with the system 30. The fibers of input 22 are untwisted and separated from tufts of latex and backing and are further reduced in size throughout the process.

When some materials are cleaned, a second cutting, chopping, grinding and/or pulling through the cutting zone 38 can be made to reduce the size of the fibers to one-half an inch or smaller. Clean fibers can create less wear and tear in loading on a grinder therefore increasing the life of the blades, screens and other components so that by placing the various component elements in series such as having a second system 50, or portion thereof in line with system 30 and box 48, then second downstream striker zone 4, if utilized, will not be subjected to the same amount of wear and tear as the upstream striker zone 4 thereby facilitating the increasing life of those blades, screens and/or other components.

After cleaning with at least one trip through the first system 30 and possibly through a second system 50 represented by box 48, and subsequent processes including additional cleaning, a float and sink process can be utilized to separate nylon from polypropylene and polyester from polypropylene as will be discussed in further detail below.

Conveyor 16 shows a process of using applicators 62 to rinse treated material 64 provided on conveyor 16 such as a belt, roller(s) or other conveying device which can then proceed on to dryer 18 for at least some embodiments. The process can then be directed through system down into float tank 21 whereby the polypropylene can be removed at outlet 66 from the top of the float tank 21 and the nylon or polyester could sink down to the lower conveyor 68 to then be removed as treated and separated output 68. The polypropylene could be provided at outlet 66, and the treated nylon or polyester would be removed as output 68. Other and/or additional, systems could be provided with other embodiments and/or materials.

As the material exits the system 30, it can then be subjected to a rotary screen cleaner 17. The screen cleaner 17 may rotate jets of water that can be used to rinse and remove contaminants broken loose from the material which can then be collected in further process. The belt dryer 18 is useful to remove moisture that can then be subjected to secondary drying and then onto a sink or float tank for separation or other separation process if necessary.

Addressing bottle flake with input 22 with this system 30 relatively easily removes adhesives and labels and then buckles and crimps the pieces so as to improve the grinding and float sink preparation capability.

Reservoirs or chambers may be employed to facilitate the flushing through the input 22 past heaters 13 and/or the coolers 14 for at least some embodiments. Fluid may be reused for various processes.

While FIG. 1 is certainly a presently preferred embodiment, alternative embodiment is shown in FIG. 2. Specifically, input 202 is shown entering a hopper 204 in the system 206 and is then taken by auger 208 to the feed inlet 210 where it is directed down into the cutting zone 212 such as by gravity or otherwise particularly when provided with a supply of fluid at fluid inlet 214 or other appropriate location.

Instead of being driven as driven as provided in FIG. 1, the embodiment of FIG. 2 has a separate cutting and flow drives. Flow impellor is shown 214 driven by cutting shaft 216 by motor 218 which can rotate preferably internally relative to drive shaft 220 driven by drive motor 222 which can drive the cutters 224 in the impeller 214. Deflector 226 can be provided similarly or dissimilarly to those provided by FIG. 1. In a preferred embodiment, the top 228 can be removed and an alternating stack of diverters 226 and cutters 224 are located on a shaft and directed into the tube 228 comprising a cutting chamber at impeller 214. Then the diverters 226 can be bolted through the tube 228 to specified positions and thus the positions of the cutters 224 are preselected. Other impellers 214 may have different configurations as are known in the art. After leaving the cutting zone 212, the traps 230,232 may operate similarly or dissimilarly to those illustrated in FIG. 1 and they can include water jets 234,236 as well as solenoid duct valves 238,240 or other appropriate means and/or mechanisms for trapping sediment. Secondary heating element 242 is illustrated as well as input 244 for adding additional fluid particularly when draining fluid out of either of valves 238,240 for at least some operations. After passing a heater 242, a chiller 246 can be employed to freeze or to subject the fluid to a cold temperature cold enough to form ice crystals but preferably not so cold as to impede the flow 248 through the piping 250, and depending on whether or not the bypass 252 is open subsequent systems 254 can be provided at box 256,258,260, etc., so that multiple systems 206,254 can be provided in series if so desired.

The output material 264,268 can then be directed to further processing for embodiments which may contain various waste products which may also have uses. From there if the product was polypropylene, the product can then be discharged to a float and sink tank 270 and conveyors can drive output such as from the bottom 272 up into an oven 274 for further processing such as to go on to an extruder 276, packaging 278 and/or a pellitize 280 for almost virgin recycled polymers 282.

The applicant has been able to remove all ash from carpet which is a significant component of the latex which otherwise would be part of the input 202 for that embodiment. Ash of less than 1% and less than about 8% has been achieved. Furthermore, extremely pure recycled bottle components can be provided at a more affordable rate than virgin material. In fact, for some embodiments, tensile strength and other properties within ten percent of the tensile strength of virgin material have been routinely obtained such as for nylon 6 and nylon 66. Furthermore, treated nylon 6 and polypropylene have extremely low ash content of less than one percent, if not nondetectable have been routinely achieved with significant tensile strengths such as within fifteen percent.

The properties of this cleaned and treated material in this recycling process have been found to be so good that when provided in pelletized form such as virgin recycled polymers 282, the potential is believed to be staggering.

The quality of the treated material has been found so amazing and full of potential. This almost virgin (i.e., within about twenty or even about ten percent for many embodiments) of many of the qualities such as tensile strength of the pure and nonrecycled products such as nylon 6, nylon 66, polypropylene, polyester and other products have given great confidence to the applicant to pursue this methodology and system due to the extremely capable results obtained. Specifically, the results of the treated products are so good that the treated virgin recycled polymers 282 whether it be nylon, polyester, polypropylene or other polymer can be relatively so highly purified that it can be a replacement and/or combined with virgin material for many applications to then be utilized by a compounder for various applications. Furthermore, due to the simplicity of the applicant's method, the applicant has discovered that recycled product can be provided significantly cheaper than new product can be produced therefore having the advantage of being environmentally friendly while simultaneously being quite a profitable enterprise.

While the prototype units function more than satisfactory for many uses, the applicant has built and tested a commercial embodiment. Using a plurality of similar sections 100 of systems 130, an input 122 can be directed into a hopper 132 which receives the input 122 which could be any of the materials described above and/or others which can then be taken by auger line 105 or otherwise and then deposited into the first cutting section 136 which can be similar to those shown in the other embodiments or different. Second cutting section 138 as well as third through eight cleaning zones 136-150 are also shown. By making in sections 100 as such, additional sections can be connected rather easily by connecting the final leg of piping leaving from cutting station 150 to the first cutting station of the adjacently added section 100 or otherwise connected. Alternatively, any particular piping segment such as section of piping 152 may be then directed by bypass 154 or otherwise in an effort to recirculate back through an inlet of a cutting section 150 or otherwise such as by recirculating through one or more sections 100. Recirculation back into the first cutting station 136 through piping 156, bypass 154 or otherwise as understood by those of ordinary skill in the art may occur at any point or additional sections 100 may be added, if that option is described.

One will notice that flanges such as flanges 158,160 may be staggered to more closely align adjacent runs such as 162,164 etc. The staggering can also occur at other areas at flange connections as well. Frame 166 may be useful to support the piping 124. Connection 168 may be useful to add fluid into the system such as at various points as desired.

Trap 111 can be utilized to remove sediment such as settled particulates as will be described in further detail below while floating particles may be removed at float outlet system 170 as will also be described in further detail below, either of which may be augered such as with auger line 105 for output as will also be discussed in further detail below.

The piping 162,164, etc. may be taken on various configurations in various embodiments such as illustrated. Motors such as motors 174 etc. may be useful to dry the cleaning zones 136-150 such as by belts and/or with other appropriate drive systems. Pressure in the system has been not particularly high in the preferred embodiment (about 15 psi) but other embodiments may have other pressures.

The applicant envisions up to thirty or more sections 100 in series for optimal output. The first few sections 100 will experience the most wear and can be changed over time particularly when using the bypass 154 of each section 100. Float outlet 170 shows one embodiment which provides cam 180 on shaft 182 which rotates through floating material and then deposits that material such as into augered shaft 184 with auger 186 to take for further processing. This way floating materials like polypropylene and ethylene materials can be easily removed from the system as would be understood by those of ordinary skill in the art as a second recycled material. Other separation systems for floating materials can be used as would be understood by those of ordinary skill in the art for various systems.

Figure 9:
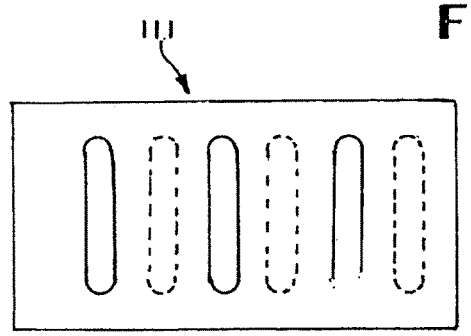
FIG. 9 is a top plan view of a first preferred trap as used with various embodiments such as shown in FIGS. 4-7.
Figure 8:
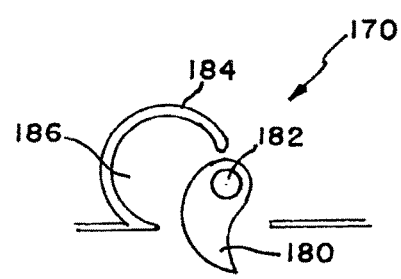
FIG. 8 is a cutaway view of a float removal system as may be used with the various embodiments of FIGS. 4-7.
Figure 10:
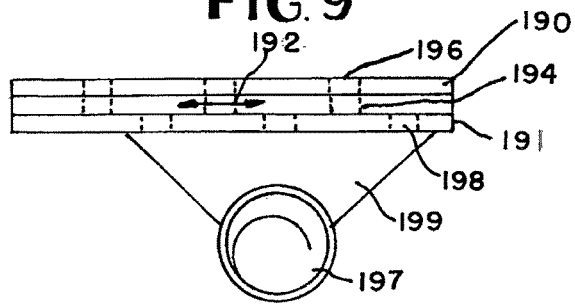
FIG. 10 is a side plan view of the trap shown in FIG. 9.

Meanwhile, traps 111 may take the embodiment as shown in FIGS. 9 and 10 or other designs. Top plate 190 is illustrated above moving plate 192 which is on top of bottom plate 191. The moving plate 192 has slots 194 which may be first alignment with slots 196 in top plate 190 so that the slots 194 can fill and then slide over to deposit through slots 198 in bottom plate 194. The material may collect and drop into collector 199 such as for augering with an auger 197 or other mechanism for further processing as at least a compact of a first recycled material. This way the materials that sink can be removed by sinks, sediment traps 111 or otherwise while the floating material can be recovered into float outlets 170 or others. Meanwhile, the bypass itself 154 may also provide slots 155 which may allow for the dropping or the deposition of material to as a sink or trap to be able to be pulled out of the system at specified locations as at least a component of a recycled material.

Material such as polypropylene, high density polyethylene, low density polyethylene, have been found to float in many systems while heavier materials such as latex particularly with latex calcium carbonate tend to form sediment in the system 100. A defoamer is often added possibly with some of the chemicals as provided with the fluid.

Eight hundred pounds of material can easily be provided in each section of piping 152,164 in sections 100. Nine thousand pounds per hour can be cleaned or alternatively the same section 100 has been tested to clean 800 pounds in three hours if one wanted to continue to bypass the recycle through a single section 100. Other throughputs may be experienced with other embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A recycling separator comprising:
   a feed inlet receiving an input, said input comprising a first recycled material and a second recycled material;
   a first cutter having an inlet and an outlet, said first cutter inlet receiving the input in combination with a liquid comprising water, said first cutter at least one of cutting, pulling apart and scrubbing the input to provide a treated input in a fluid at the first cutter outlet;
   at least one of a trap and a sink for removing settled material from the treated input in the fluid downstream of the outlet of the cutter, whereby the settled material is at least a component of a first recycled material;
   wherein the treated input is conveyed via piping and the recycling separator is adapted to separate the first recycled material from the second recycled material.

2. The recycling separator of claim 1 wherein the input is selected from one of a paper-based waste, a plastic film based waste, carpet waste, and plastic bottle waste.

3. The recycling separator of claim 1 wherein after leaving the first cutter, the treated input is directed to one of a second cutter and the inlet of the first cutter.

4. The recycling separator of claim 3 further comprising a heater heating the treated input before directing to the one of the second cutter and the inlet of the first cutter.

5. The recycling separator of claim 3 wherein the second cutter receives the treated input and the second cutter is located parallel to the first cutter.

6. The recycling separator of claim 5 further comprising a bypass and when in a bypass configuration treated input is directed from after leaving the second cutter to the inlet of the first cutter.

7. The recycling separator of claim 5 wherein the first and second cutters are two of a plurality of cutters in a section, and a plurality of sections are connected in series.

8. The recycling separator of claim 3 further comprising a cooler and the treated input is cooled before directing to the one of the second cutter and the inlet of the first cutter.

9. The recycling separator of claim 1 further comprising a float outlet whereby floating material is removed from the treated input downstream of the first cutter outlet and is at least a component of a second recycled material.

10. The recycling separator of claim 9 wherein the second recycled material is one of a polypropylene and an ethylene based material.

11. The recycling separator of claim 1 wherein the first recycled material in one of polyester, nylon and latex containing materials.

12. The recycling separator of claim 1 wherein the first cutter is downwardly oriented with the first cutter inlet located above the first cutter outlet.

13. The recycling separator of claim 1 wherein the first cutter is rotationally operated and linearly oriented from the first cutter inlet to the first cutter outlet.

14. A recycling separator comprising:
- a feed inlet receiving input, said input comprising a first recycled material and a second recycled material;
- a first cutter having an inlet and an outlet, said first cutter inlet receiving the input in combination with a liquid comprising water, said first cutter at least one of cutting, pulling apart and scrubbing the input to provide a treated input in the liquid at the first cutter outlet;
- a float outlet whereby the first recycled material is separated from the second recycled material; and whereby floating material is removed from the treated input downstream of the first cutter outlet and is at least a component of the second recycled material;
- at least one of a trap and a sink or removing settled material from the treated input in the fluid downstream of the outlet of the cutter, whereby the settled material is at least a component of the first recycled material.

15. The recycling separator of claim 14 whereby the floating material is automatedly removed from the treated input.

16. The recycling separator of claim 14 wherein the input is selected from one of a paper-based waste, a plastic film based waste, carpet waste, and plastic bottle waste.

17. The recycling separator of claim 14 wherein after leaving the first cutter, the treated input is directed to one of a second cutter and the inlet of the first cutter.

18. The recycling separator of claim 17 further comprising a heater heating the treated input before directing to the one of the second cutter and the inlet of the first cutter.

19. The recycling separator of claim 17 wherein the second cutter receives the treated input and the second cutter is provided in series relative to the first cutter.

* * * * *